United States Patent [19]

Morishita et al.

[11] 4,007,488
[45] Feb. 8, 1977

[54] SOLID-STATE COLOR IMAGING APPARATUS HAVING CHARGE-COUPLED DEVICES

[75] Inventors: Masanobu Morishita; Hidehiko Inoue; Mitsuru Kawasaki, Tokyo, Japan

[73] Assignee: Nippon Electric Co., Ltd., Tokyo, Japan

[22] Filed: Feb. 6, 1976

[21] Appl. No.: 656,007

[30] Foreign Application Priority Data

Feb. 7, 1975 Japan .............................. 50-16111
Oct. 27, 1975 Japan ............................ 50-129151

[52] U.S. Cl. .................................. 358/29; 358/41; 358/213
[51] Int. Cl.² .................. H04N 9/04; H04N 9/535; H04N 3/14
[58] Field of Search ..................... 178/DIG. 39, 7.1; 250/211 J, 211 R, 578; 315/169 R, 169 TV; 358/29, 41, 50, 80, 44

[56] References Cited

UNITED STATES PATENTS 2,790,847  4/1957  Houghton ........................... 358/29

Primary Examiner—Robert L. Richardson

[57] ABSTRACT

A color signal imaging apparatus includes a charge-coupled device to convert a light signal to an electrical video signal. The time during which charges are accumulated in the imaging area of the charge-coupled device is made variable so as to enable the ready compensation of the video signal components.

5 Claims, 15 Drawing Figures

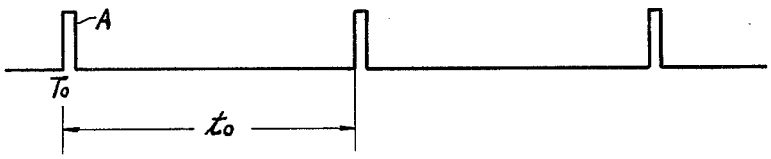
FIG. 3A
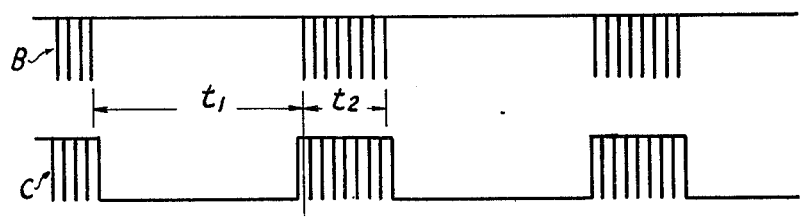
FIG. 3B
FIG. 3C
FIG. 3D
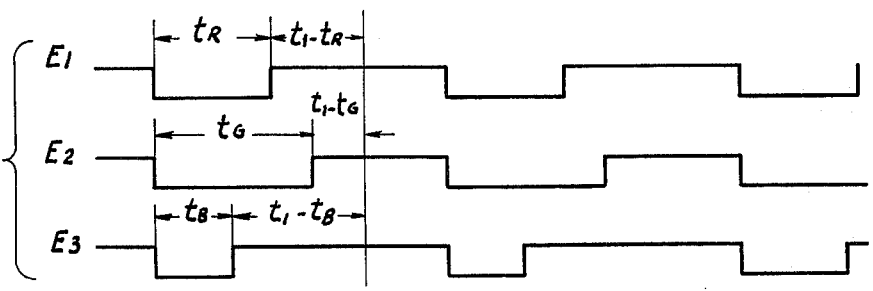
FIG. 3E
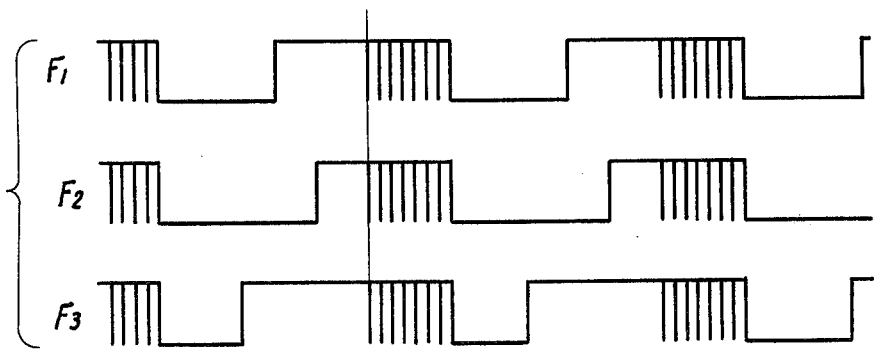
FIG. 3F

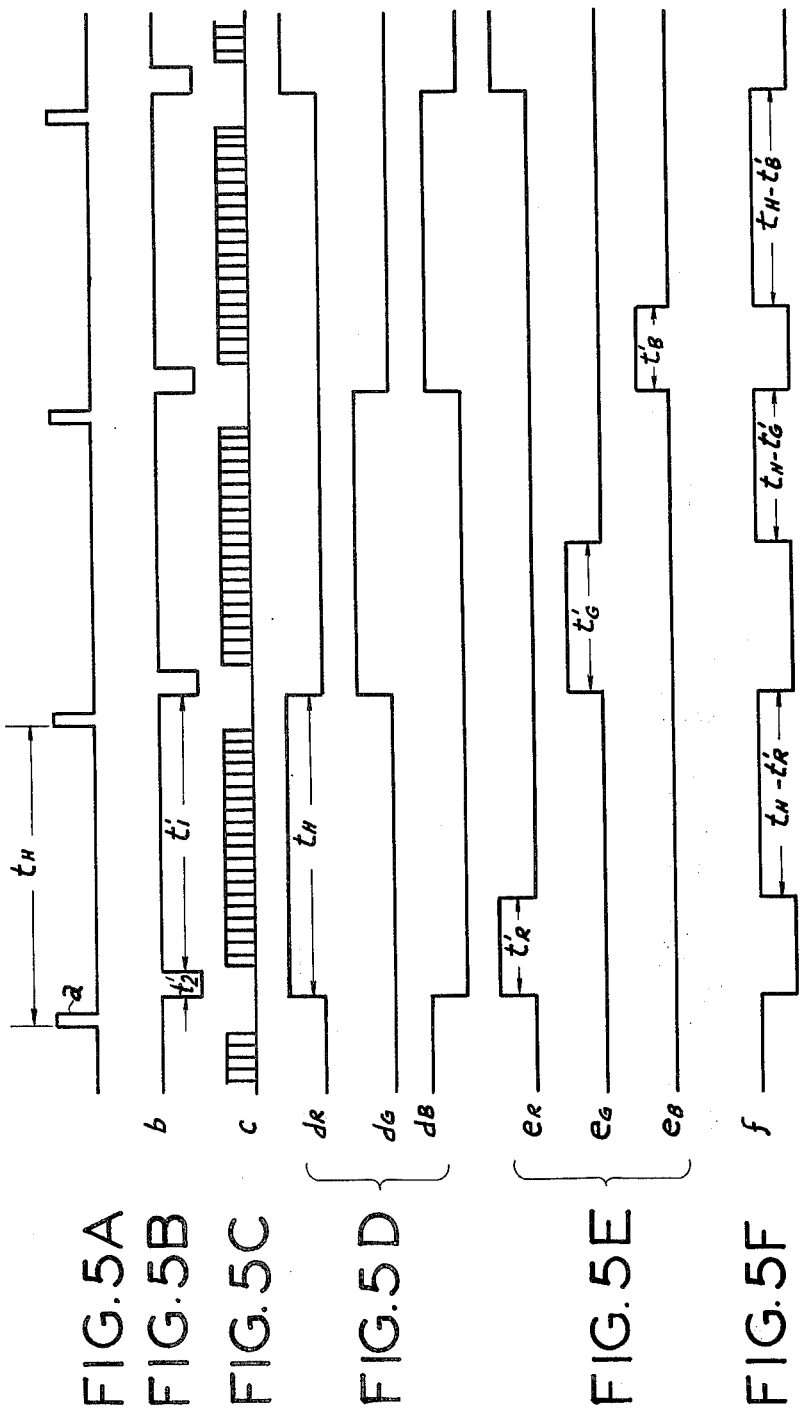

SOLID-STATE COLOR IMAGING APPARATUS HAVING CHARGE-COUPLED DEVICES

The present invention relates generally to color imaging apparatus, and more particularly to a solid-state color imaging apparatus using charge-coupled devices.

In prior art imaging apparatus, the incident light is separated into a plurality of color components such as the red, green and blue primary components, which are applied to a plurality of photosensing elements. In these known apparatus, it has been necessary to compensate for differences in the intensity of the color components and in the photoelectric characteristics of the photosensing elements. For this purpose, the color components are passed respectively through filters having filter characteristics which match the individual chrominance and photoelectric characteristics.

In this type of imaging apparatus, it is impossible to determine the filter characteristics with sufficient precision to match the chrominance and photoelectric characteristics. Furthermore, once determined, the characteristics of a filter cannot be later modified. This is most inconvenient when the need arises to compensate for any deviation in the photoelectric characteristics among the photosensing elements in connection with aging or element replacement. One proposed solution to this problem has been to adjust the gain of the video amplifier according to each color component. In practice, this approach has involved great design complication.

It is therefore an object of the invention to provide a solid-state color imaging apparatus, in which color balance adjustment is easily achieved.

In a solid-state imaging apparatus using a charge-coupled device (hereinafter abbreviated to CCD), the scanning period is essentially independent of the charge accumulating period because a CCD operates as a shift register. The invention utilizes the characteristic of a CCD that the output level of the CCD against incident light intensity, i.e., the photoelectric conversion characteristic changes with the change in the charge accumulating time. Thus, by controlling the time for which charges are accumulated in the CCD, differences in the light intensity of a plurality of color components and among photoelectric conversion characteristics of charge-coupled elements are compensated for, whereby the color components of the incident light are balanced in terms of the output signal level.

The apparatus of the invention is thus solid-state imaging appratus capable of electrically compensating for differences among the intensities of a plurality of color components of the incident light.

Other objects, features and advantages of the invention will be apparent from the following detailed description of several embodiments thereof taken in conjunction with the accompanying drawings, wherein:

FIGS. 3A–3F are waveform diagrams of signals appearing at various parts of the apparatus shown in FIG. 1;

FIGS. 5A–5F are waveform diagrams of signals appearing at various parts of the apparatus shown in FIG. 3.

Figure 1:
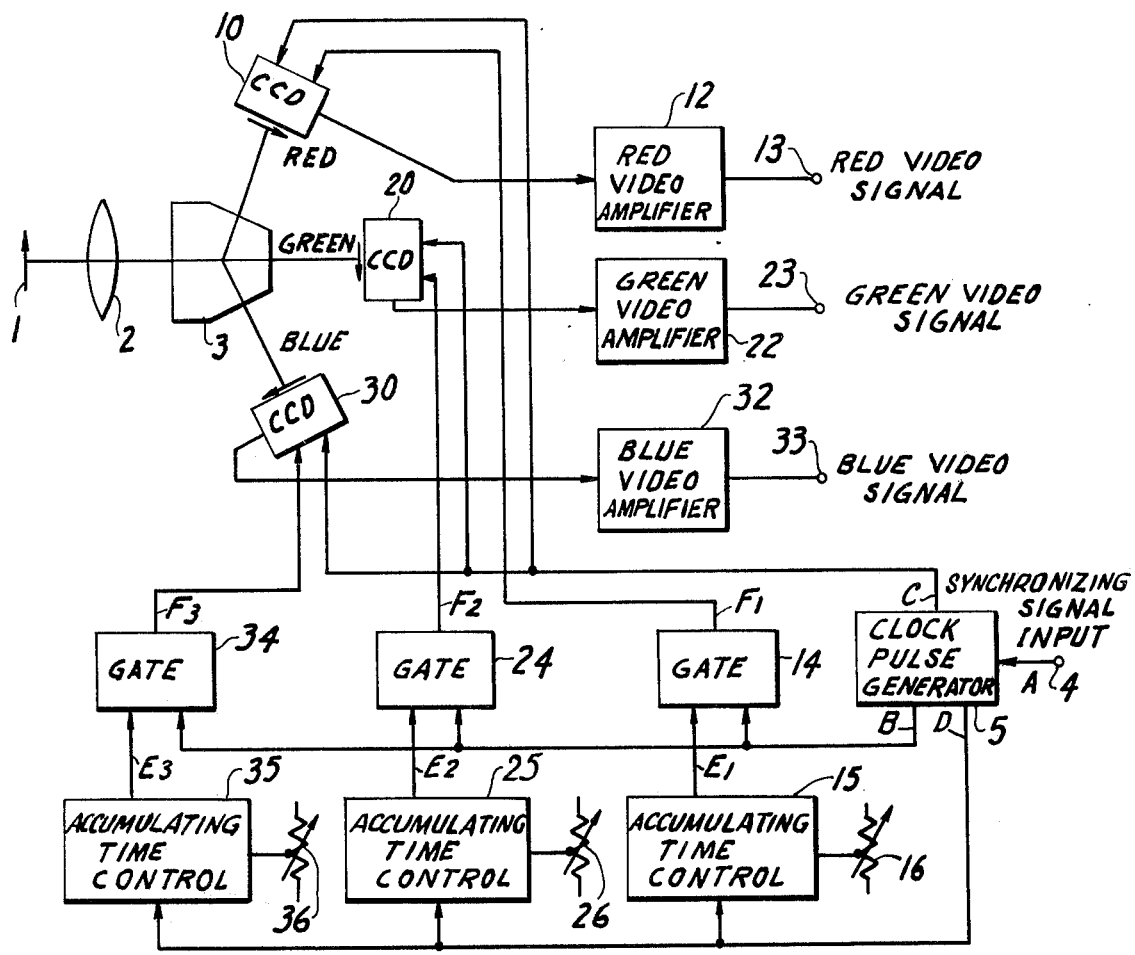
FIG. 1 is a block diagram of an imaging apparatus according to a first embodiment of the invention.
Figure 2:
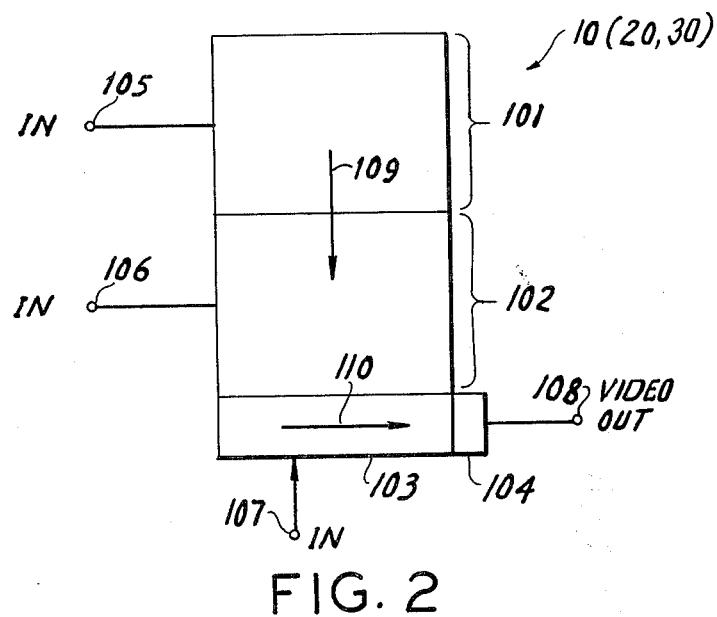
FIG. 2 is a schematic diagram of a CCD used in the apparatus shown in FIG. 1.

In the embodiment of the invention illustrated in FIG. 1, incident light rays from an object 1 are applied through a lens 2 to a prism type tricolor separating optical system 3, whereby the incident light rays are separated into their three primary color components, to wit, the red, green and blue components. The red, green and blue color components are respectively applied to CCD's 10, 20 and 30, whereby red, green and blue images are formed on the surfaces of the CCD's 10, 20 and 30, respectively. Each of the CCD's 10, 20, and 30 have an element construction as shown in FIG. 2. The charge transfer in the CCD's 10, 20, 30 is of the frame transfer system as described in an article titled "A Charge-Coupled Area Image Sensor and Frame Store" by C. H. Sequin et al. on pp 244–252, IEEE Transactions on Electron Devices, Vol. ED-20, Vol. 3, March 1973.

Referring to FIG. 2, the CCD 10 (or 20 or 30) comprises an imaging area 101, a storage area 102, a read-out register 103, a readout part 104, an input terminal 105 to which external drive pulses are applied for transferring charges in the imaging area 101, an input terminal 106 to which external drive pulses are applied for accumulating charges in the storage area 102, an input terminal 107 to which external drive pulses are applied for transferring charges in the read-out register 103, and a video signal output terminal 108. The arrows 109 and 110 indicate the directions in which charges are transferred. In addition to the frame transfer type charge transfer device, as illustrated in FIG. 2, other types of CCD's may be used for the purpose of the invention as long as arrangements are made to enable the period of charge storage in the photoelectric converter to be arbitrarily determined.

The charges are accumulated in the imaging area 101 in response to the incident light rays, and are then parallel-transferred to the storage area 102 during the vertical blanking period, and are stored in the storage area. The charges stored in the storage area 102 are parallel-transferred by one step for every horizontal scanning period, whereby the charges stored in the lowermost charge-coupled array are transferred to the read-out register 103. The charge transfer in the storage area 102 and to the read-out register 103 is performed during the horizontal blanking period. The charges transferred from the storage area 102 to the read-out register 103 are serial-transferred, whereby a video signal of the respective color component is obtained through the read-out part 104 at the terminal 108. The respective video signals from the CCD's 10, 20 and 30 are supplied to video amplifiers 12, 22 and 32, to provide red, green, and blue output video signals at output terminals 13, 23 and 33 respectively.

On the other hand, a vertical synchronizing signal A, as shown in FIG. 3A, is supplied from a synchronizing signal input terminal 4 to a clock pulse generator 5, which generates a clock pulse B as shown in FIG. 3B, to be applied to the input terminal 105 for accumulating charges proportional in intensity to the incident light, and another clock pulse C, as shown in FIG. 3C, to be applied to the input terminal 106 for transferring the accumulated charges. In FIG. 3, $t_1$ denotes a period for which charges are accumulated, and $t_2$ denotes a period for which the accumulated charges are transferred. The total period $t_o$ corresponds to one field of television. In a prior art solid-state imaging apparatus, the clock pulses B and C are supplied directly to the CCD's. Whereas, according to the invention, the clock pulse B is supplied to the CCD's 10, 20 and 30 through gate circuits 14, 24 and 34.

The clock pulse generator 5 also generates a reference-phase pulse D as shown in FIG. 4D and indicating the fall timing $T_o$ of the charge transfer clock pulse C, i.e., the phase of the synchronizing signal A. The reference-phase pulse D is supplied to charge accumulating time controllers 15, 25 and 35, each of which may be constituted, for example, of a monostable multivibrator, which generate control pulses $E_1$, $E_2$ and $E_3$ having widths $t_R$, $t_G$ and $t_B$ (FIG. 3E) variable-resistance time setters 16, 26 and 36. These control pulses are supplied to the gate circuits 14, 24 and 34 to gate the charge accumulating clock pulse B. As a result, charge accumulating pulses $F_1$, $F_2$ and $F_3$ (FIG. 3F) appear at the outputs of the gate circuits 14, 24 and 34. These pulses, together with the charge transfer clock pulse C, are supplied to the CCD's 10, 20 and 30. The period $(t_1 - t_R)$ of the pulse $F_1$ for which charges corresponding to the red color component are accumulated is shorter than the charge accumulating time $t_1$ at the clock pulse B by the period $t_R$. Because the period $t_R$ can be changed by adjusting the time setter 16, the charge accumulating period can be changed by the time setter 16. In like manner, the charge accumulating periods $(t_1 - t_G)$ and $(t_1 - t_B)$ for the green and blue components can be changed by the time setters 26 and 36, respectively. Color balance is established in such manner that a white object is used as the object 1, and the setters 16, 26 and 36 are so adjusted that the levels of red, green and blue video output signals at the output terminals 13, 23 and 33 are made equal to each other.

Figure 4:
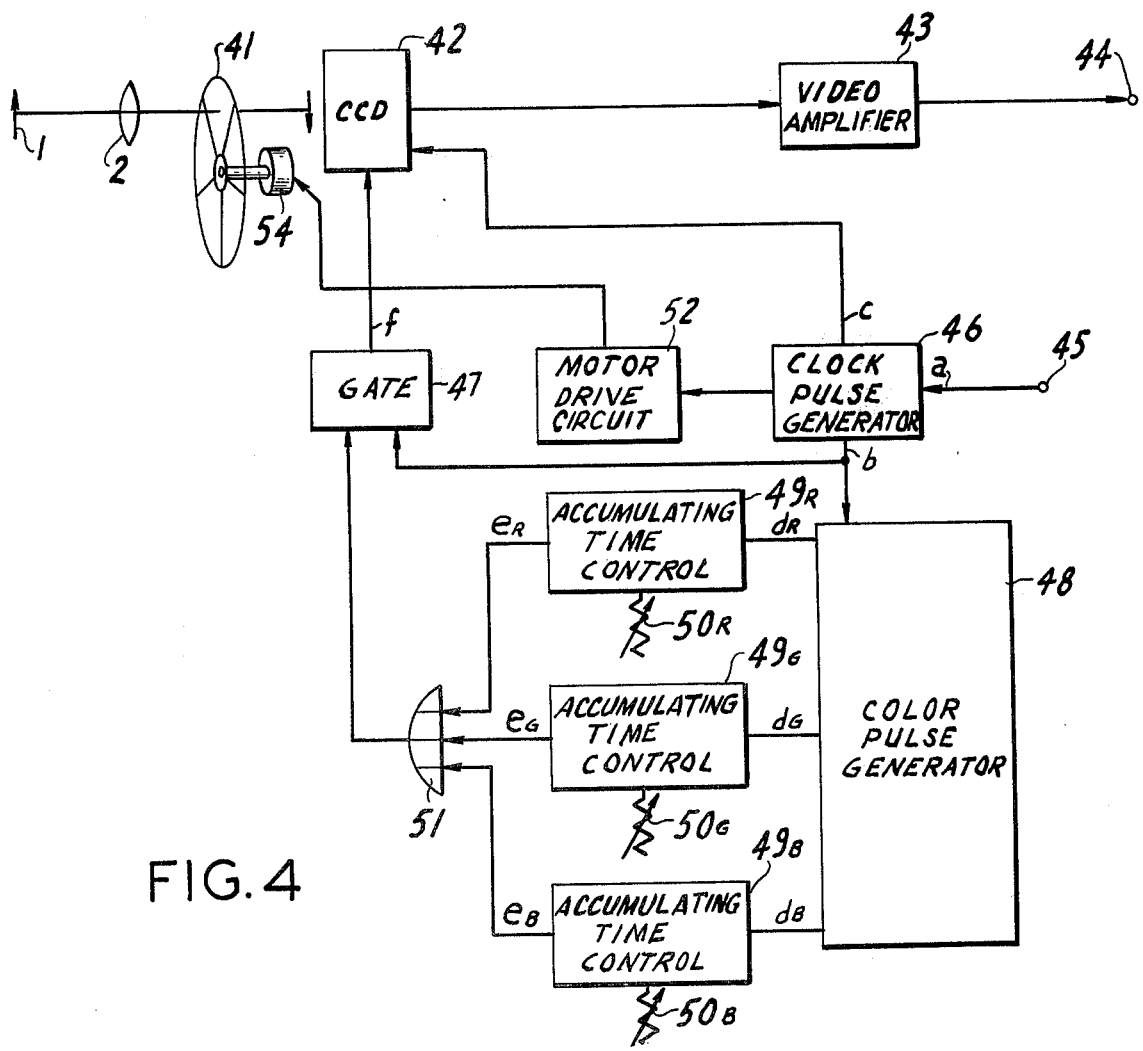
FIG. 4 is a block diagram of an imaging apparatus according to a second embodiment of the invention.

One specific embodiment of the invention has been described above wherein CCD's of the two-phase drive type are used. Instead of the two-phase drive type, a three-phase or four-phase drive type of CCD may be used. Moreover, instead of the tricolor separation optical system 3, the combination of a relay lens and a dichroic mirror may be used. In the embodiment of the invention shown in FIG. 1, the incident light is resolved into the three primary color components, red, green and blue. The system of the invention is, however, useful also for applications where the incident light is resolved into luminance and chrominance components. As shown in FIG. 4, a tri-color separation optical system may be constituted of a sequential type color separation system in which the incident light is resolved into the primary colors on a time-sharing basis by rotating a disk color filter. The use of this type of optical system, together with a means for switching the charge accumulating time for each field, will meet the purpose of the invention.

Referring to FIG. 4 showing a second embodiment of the invention, incident light rays from the object 1 are applied through the lens 2 to a color filter disc 41 rotating at a predetermined speed and having red, green and blue filters, whereby the incident light rays are separated into the red, green and blue color components line-sequentially or on a time-sharing basis. The color components are in turn applied to a linear CCD 42 where they are converted into a line-sequential color video signal. The linear CCD is described in a copending U.S. patent application, Ser. No. 557,845, entitled "CHARGE-COUPLED LINEAR IMAGE SENSING DEVICE". The line-sequential color video signal is supplied to a video amplifier 43 to provide an output video signal at a terminal 44.

A horizontal synchronizing signal $a$, as shown in FIG. 5A is supplied from a terminal 45 to a clock pulse generator 46. The generator 46 produces a clock pulse $b$, shown in FIG. 5B, for accumulating the charges, and a clock pulse $c$, as shown in FIG. 5C, for transferring the accumulated charges. (Generator 46 also provides motor control pulses to a motor drive circuit 52, which, in turn, provides a drive signal to a motor 54 that rotates the color filter disc 41.) In FIG. 5, $t_1'$ denotes a period for which charges are accumulated, and $t_2'$ denotes a period for which the accumulated charges are transferred. The total period $t_H$ $(=t_1' + t_2')$ corresponds to one horizontal scanning period (H). In a prior art solid-state imaging apparatus, the clock pulses $b$ and $c$ are supplied directly to the CCD. Whereas, according to the embodiment of the invention illustrated in FIG. 4, the clock pulse $b$ is supplied to the CCD 42 through a gate circuit 47.

The clock pulse $b$ is also supplied to a color pulse generator 48 to produce red, green and blue pulses $d_R$, $d_G$ and $d_B$ differing by 120° from one another and each having a pulse width of 1H and a repetition period of 3H. The pulses $d_R$, $d_G$ and $d_B$ are supplied to charge-accumulating time controllers 49 ($49_R$, $49_G$ and $49_B$) each constituted, for example, of a monostable multivibrator. The time controllers 49 produce control pulses $e_R$, $e_G$ and $e_B$ having widths $t_R'$, $t_G'$ and $t_B'$ set by variable-resistance time setters $50_R$, $50_G$ and $50_B$. These control pulses are supplied from an OR circuit 51 to the gate circuit 47 to gate the charge accumulating clock pulse $b$. As a result, a charge accumulating pulse $f$ appears at the output of the gate circuit 47. The pulse $f$, together with the charge transfer clock pulse $c$, is supplied to the CCD 42. The periods $(t_H - t_R')$, $(t_H - t_G')$ and $(t_H - t_B')$ are for the charge accumulation of the red, green and blue color components, respectively. Because the periods $t_R'$, $t_G'$ and $t_B'$ can be changed by adjusting the time setters $50_R$, $50_G$ and $50_B$, the charge accumulating periods can be changed by the time setters.

As described above, the invention makes it readily possible to establish color balance among components of various wavelengths and to change the period for which charges for the desired color component are accumulated.

While one specific embodiment of the invention and a few modifications thereof have been described, it is to be understood that numerous variations may occur to those skilled in the art without departing from the spirit of the invention.

What is claimed is:

1. A solid-state color imaging apparatus for producing a color video signal from incident light rays, said apparatus comprising means including at least one charge-coupled device having an imaging area for accumulating charges in response to said incident light rays, a storage area for transferring the accumulated charges, and a read-out means for producing an electrical video signal from the transferred charges for producing a video signal;

means for producing first and second driving pulses in response to a synchronizing signal, said first driving pulse setting a time period during which said charges are accumulated in said imaging area and said second driving pulse causing said charge transfer; and, means operatively connected to said first driving pulse producing means for controlling said time period of said first driving pulse.

2. The solid-state color imaging apparatus as claimed in claim 1, wherein said video signal producing means includes a plurality of charge-coupled devices, and further comprising means for separating said incident light rays into a plurality of color components to be applied to said video signal producing means, said controlling means separately controlling the time periods of said first driving pulses for the respective ones of said charge-coupled devices.

3. The solid-state color imaging apparatus as claimed in claim 1, further comprising means for separating said incident light rays into a plurality of color components on a time-sharing basis, said controlling means controlling said time period of said first driving pulse on a time-sharing basis.

4. The solid-state color imaging apparatus as claimed in claim 1, in which said first pulse signal producing means comprises a means for producing a gate signal and gating means receiving said gate signal as well as a series of pulses, said controlling means comprising means for selectively varying the width of said gate signal.

5. The solid state color imaging apparatus of claim 4, in which said gate signal producing means comprises a multivibrator and said gate signal width varying means comprises a variable resistance.

* * * * *